March 14, 1933.  V. G. VAUGHAN  1,901,616
AUTOMATIC COOKING DEVICE
Filed May 31, 1930
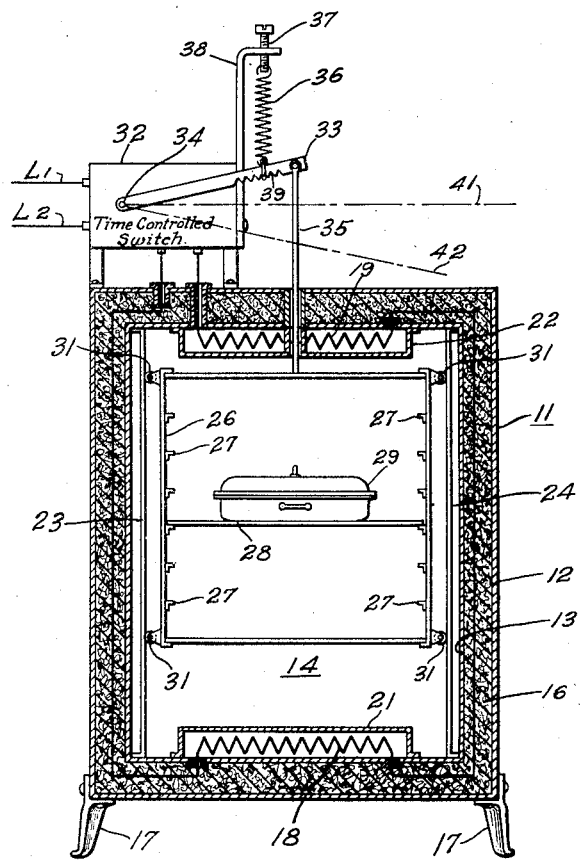
INVENTOR
*Victor G. Vaughan.*
BY
*Wesley G. Carr*
ATTORNEY Patented Mar. 14, 1933

1,901,616

UNITED STATES PATENT OFFICE

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA

AUTOMATIC COOKING DEVICE

Application filed May 31, 1930. Serial No. 458,087.

My invention relates to cooking devices, and more particularly to automatic-electric cooking appliances.

An object of my invention is to provide an automatic-electric cooking device that shall be operative to effect proper cooking of a quantity of food in accordance with the weight thereof.

Another object of my invention is to provide a simple and inexpensive automatic means for controlling the energization of a heating element in accordance with the weight and character of food to be cooked.

In practicing by invention, I provide a heating element, which may be located within a suitable casing, a floating frame within the casing which is supported by a spring-biased lever or bar, which lever or bar controls the operation of a time controlled switch.

The single figure of the drawing is a view in vertical section through a device embodying my invention.

I have elected to show an oven 11 which comprises suitable outer and inner casings 12 and 13, respectively, defining an oven or cooking chamber 14 and having located therebetween a mass of heat-insulating material 16, such as mineral wool. Legs 17 are provided in accordance with usual practice to support the oven 11 and, while no specific details of construction are shown, it is to be understood that I may employ any suitable or desired type of oven whether it be heat insulated, as hereinbefore described, or not. While no door is shown, it is to be understood that such element is provided in accordance with usual practice in such ovens.

A pair of heating elements 18 and 19 are indicated schematically only as being located within suitable cover members 21 and 22 and here again the showing is schematically only and is to be taken as representing any suitable or desired type of heating elements.

A plurality of vertically extending guides 23 and 24 are provided at the respective side walls of the oven structure and serve to hold a floating frame 26 within the oven chamber 14. The frame 26 is of any suitable or desired shape and may be made of open construction and provided with a plurality of pairs of slides 27 located on opposed side members of the frame 26 upon which a platform 28 may be located for receiving and supporting a cooking vessel 29. Rollers 31 are provided on the outside of the frame 26 and engage the vertical members 23 and 24 to permit the frame 26 to have limited vertical movement within the oven for a purpose to be hereinafter set forth in detail.

A time-controlled switch mechanism is shown as being contained in a suitable box 32 and is of the following general type: a switch which controls the energization of the heating elements 18 and 19 is normally biased to its open position and is so connected with a clock or other suitable time mechanism that, upon suitable movement of an actuating element, the switch is closed and the clock will operate for a predetermined length of time in accordance with the degree of movement of the actuating means to cause the switch to again interrupt the circuit after the expiration of the desired time.

The actuating element in this instance is indicated by a bar or lever 33 pivotally mounted at one of its ends on a stub shaft 34 which is operatively connected with the time mechanism to effect the control hereinbefore mentioned. The other end of the lever 33 is pivotally connected to a rod 35 secured to the frame 26 and extending through a suitable aperture in the roof of the oven. A spring 36 has one end connected to the lever 33, while its other end is adjustably mounted in a suitable manner in a set-screw 37 which is, in turn, mounted in a bracket 38 secured to the box 32. The connection between the spring and the lever 33 is made adjustable, as by a plurality of recesses 39, in which the lower end of the spring may be selectively located.

Supply circuit conductors $L_1$ and $L_2$ are indicated as the source of electrical energy for the heating elements 18 and 19 and suitable conductors have been shown extending from the time-controlled switch to the respective heating elements and back through the box 32, it being understood that while a series circuit connection of the elements 18 and 19 has been shown, I do not desire to be limited thereto, as any suitable connection may be employed.

I have found, by experiment, that automatic cooking can be effected in a highly acceptable manner by providing a predetermined number of watthours of electric energy per pound of food. That is, if a five pound roast of a particular kind of meat is to be cooked, it will require a predetermined number of watthours, while if a ten pound roast of the same kind of meat is to be cooked, it will require substantially twice that number of watthours exclusive, of course, of the amount of energy absorbed by the oven or radiated by it. If, on the other hand, an entirely different kind of food is to be cooked, which may contain considerable moisture, the predetermined number of watthours of energy input will be quite different. The mechanism hereinbefore described and illustrated in the drawing permits of expending a number of watthours in cooking certain foods, which number of watthours will be directly in accordance with the weight of the food.

If, for instance, a five pound roast is placed in the container 29 which is, in turn, placed on the support 28, the lever or bar 33 may move to the broken line position indicated by numeral 41. This has the effect of winding up or otherwise so actuating the time control mechanism that it will operate for a predetermined length of time to cause the energization of the heating element or elements for that predetermined length of time, and it is usually possible, by experiment, to determine the proper length of time and, therefore, of the amount of energy to be expended to properly cook a certain food. If, now, a substantially larger roast, say a ten pound roast, be placed in the floating frame 26, the lever 33 may move downwardly to the position indicated by numeral 42 and the length of time that the time controlled switch mechanism in box 32 will operate will be greater than that during which it would operate if the lever had moved to the position indicated by broken line 41.

In order to permit of varying the number of watthours for a given weight of food in accordance with the character thereof, the spring 36 may have its point of engagement with the lever 33 varied as by locating it in any one of the recesses 39.

The device and method embodying my invention thus provides a relatively simple and inexpensive structure which will permit of an operator placing a certain quantity of food in operative relation to the heating elements and which mechanism will insure that the food will be properly cooked at the expiration of a predetermined time.

Various modifications may be made in my invention without departing from the spirit and scope thereof, and I desire, therefore, that only such limitations shall be placed thereon as are imposed by the prior art or are set forth in the appended claims.

I claim as my invention:

1. In an electric cooking device having a heating element, a switch for controlling the energization of the heating element and a time mechanism for controlling the operation of the switch, means for effecting energization of the heating element for a length of time in direct accordance with the initial weight of the food to be cooked, said means including a floating frame for supporting the food to be cooked, a spring biased lever for controlling the length of time of operation of the time mechanism and means for connecting the floating frame and the spring biased lever to move the lever through a distance in accordance with the initial weight of food to be cooked.

2. In an electric cooking device having an electric heating element, a switch for controlling the energization of the heating element and a time mechanism for controlling the operation of the switch, means for effecting energization of the heating element in direct accordance with the initial weight of food to be cooked, said means including a lever having one end operatively connected to the time mechanism to cause the time mechanism to maintain the switch in its closed position for a length of time in direct accordance with the angular movement of the lever from a predetermined initial position, a spring for normally yieldingly holding the lever in said predetermined position in which the time mechanism is inoperative and the switch is open, and a floating frame supported by said lever for carrying the food to be cooked.

3. A cooking device including a heating element, a switch controlling the energization of the heating element, means for biasing the switch to its open position, means for closing the switch by the weight of material to be operated on by the heating element and a time device controlling the switch and effective to open the same after a period of time dependent on the initial weight of the material and independent of its final weight.

4. A device as set forth in claim 3, characterized in that the switch biasing means is adjustable to vary the time period of energization of the heating element.

5. A device as set forth in claim 2, characterized in that the spring is selectively engageable with the lever at a plurality of different points along its length to vary the length of time of energization of the heating element.

In testimony whereof, I have hereunto subscribed my name this 19th day of May, 1930.

VICTOR G. VAUGHAN.